G. R. TREVILLIAN.
COLLAPSIBLE OR FOLDING GOCART.
APPLICATION FILED JUNE 21, 1920.
1,373,034.
Patented Mar. 29, 1921.
3 SHEETS—SHEET 3.
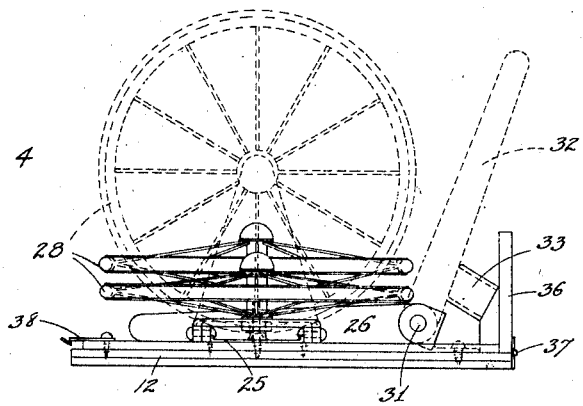
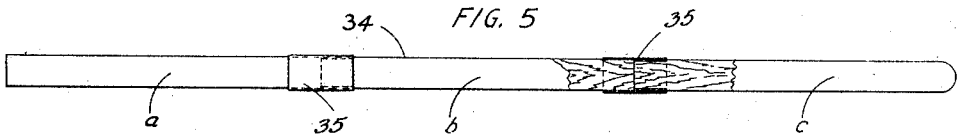
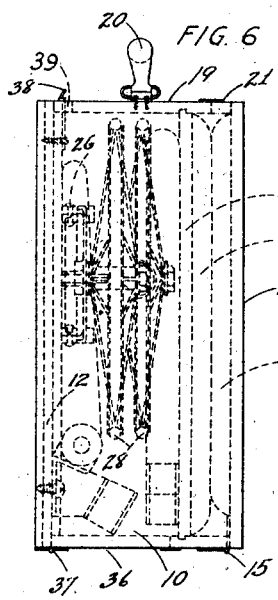 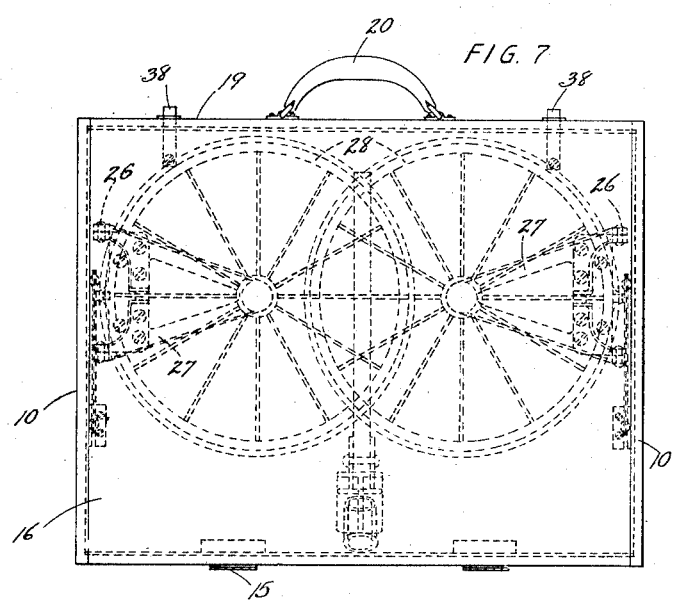
WITNESSES:
INVENTOR

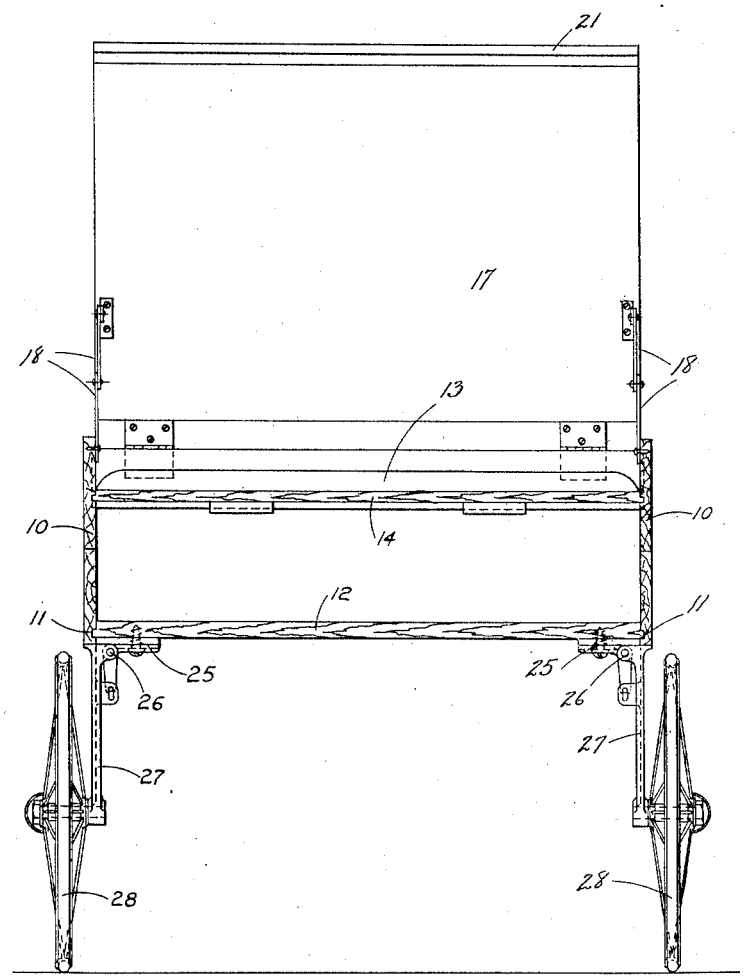

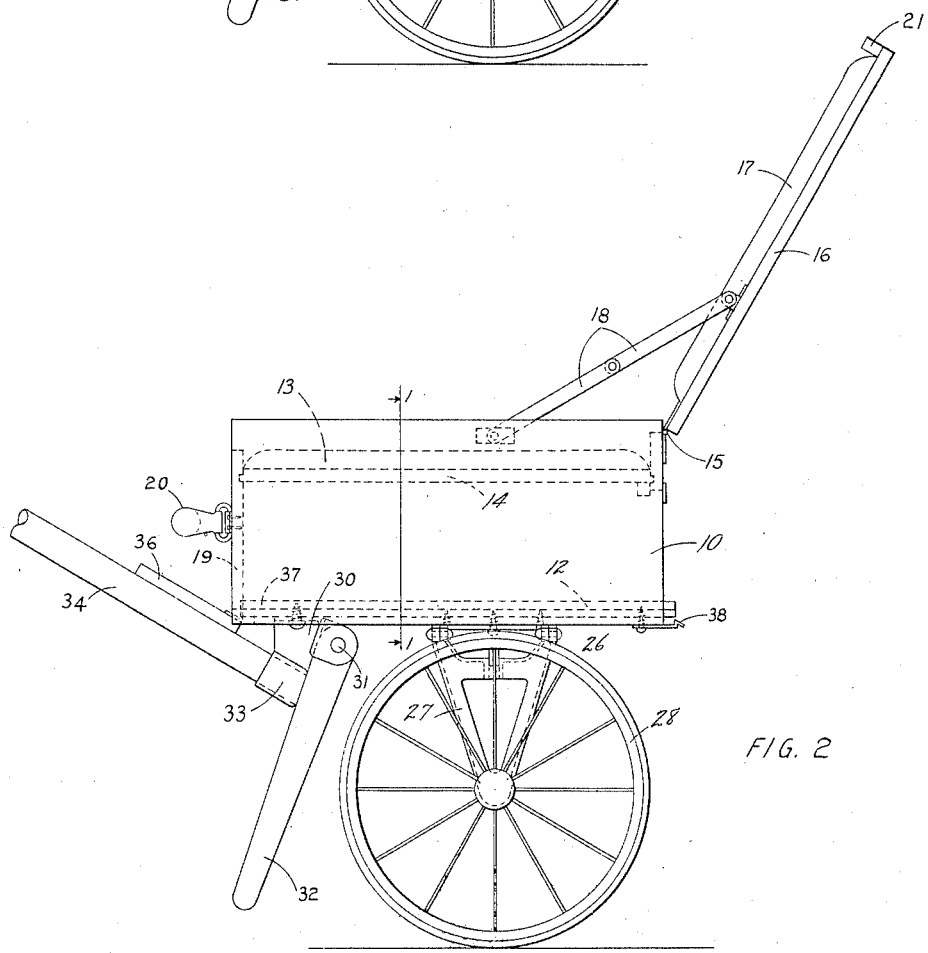

UNITED STATES PATENT OFFICE.

GUY R. TREVILLIAN, OF CICERO, ILLINOIS.

COLLAPSIBLE OR FOLDING GOCART.

1,373,034.    Specification of Letters Patent.    Patented Mar. 29, 1921.

Application filed June 21, 1920. Serial No. 390,498.

*To all whom it may concern:*

Be it known that I, GUY R. TREVILLIAN, a citizen of the United States, residing at Cicero, in the county of Cook and State of Illinois, have invented certain new and useful Improvements in Collapsible or Folding Gocarts, of which the following is a specification.

This invention relates to a wheeled cart adapted particularly to carry a small child, and is concerned with certain features of construction by which it may be collapsed and its parts be folded away within a conveniently portable case. The objects and purposes of this invention will appear more fully hereinafter from the specification and claims, and from the accompanying drawings which illustrate an embodiment of the invention in a preferred form in the manner following:

Figure 1 is a vertical section taken on line 1—1 of Fig. 2;

Fig. 2 is a side elevation;

Fig. 3 is a similar view of the cart wheels with body detached therefrom;

Fig. 4 is a side elevation of the cart wheels folded together;

Fig. 5 shows the tongue or handle for the cart; and

Figs. 6 and 7 are end and side elevations, respectively, of the case which is produced from the cart body.

The cart comprises a wheel portion and a body portion, each separable from the other when the device is to be folded up for carrying. The body portion, as best shown in Figs. 1 and 2, may be in the form of a box having sides 10 each of which is longitudinally grooved as at 11 adjacent its lower edge so as to receive therebetween a sliding bottom 12. Arranged above the bottom at a desired height is a seat 13 preferably supported upon a board 14, which lies in spaced relation to the bottom. Hinged as at 15 is a back 16 which may be padded as at 17, the swinging movements of the back upon the body being limited as by means of a pair of links 18, the relation of the back to the body being such that the back may be swung down upon the seat, as indicated in Fig. 6. In this position the back becomes a lid or cover for the case which is formed by closing up the body in this manner.

At the forward end of the body is a front wall 19 equipped with a handle 20 to facilitate carrying of the case. It will be noted that the upper edge of the front wall terminates approximately even with the seat 13, and that the back is provided with a rail 21 along its free edge, the rail being arranged to meet the upper edge of the front wall 19 when the back is closed down upon the body. The body may be open beneath its seat upon the back side which, however, is closed when the device is collapsed or folded up, as will presently appear.

Upon the under side of the bottom are secured a pair of fittings 25 to each of which is hinged as at 26 a bracket 27 carrying at its free end a wheel 28 on which the cart is adapted to travel. Each of these brackets may be provided with means (not shown in detail) for normally preventing collapse thereof and are also capable of swinging inwardly so as to fold one wheel upon the other, as shown in Figs. 4 and 6. At the forward end of the bottom upon its underside is another fitting 30 in which is hingedly mounted as at 31 a supporting post 32; this fitting further provides a socket 33 for the end of a tongue or handle 34 which, if desired, may be of sectional construction, as indicated in Fig. 5 where it is shown to consist of three pieces, *a*, *b*, and *c*, connected in endwise relation through the medium of sleeves 35 in any approved manner. At the forward end of the bottom is a foot board 36 hinged as at 37, the board normally being supported upon the tongue so as to form a rest for the feet of the occupant.

In use as a go-cart, the various parts will be related, as best shown in Fig. 2. In order that the device may be folded up in a convenient manner for carrying, the back 16 is folded down upon the seat in the manner shown in Fig. 6, and the bottom 12 is slidingly withdrawn from between the body sides, and then replaced therebetween with its underside on top and its rearward edge in first. In replacing the bottom in this fashion, the post 32 is folded down thereupon, the two wheels are folded together, as shown best in Figs. 4 and 6, the tongue sections are disconnected, and when the bottom has been received between the sides in this manner, the foot rest 36 is folded up to provide a closure for the back side of the body. In order that the parts may be retained in this relation, a spring catch 38 may be secured adjacent the under side of the rear edge of the bottom which, when inverted and replaced between the body walls is entered through an opening 39 formed in the front wall 19, to lock therewith, as shown in Fig. 6. Likewise the back 16 may be provided with any suitable catch for holding it in closed position, as may also the foot rest 36 so as to maintain it in position where it will constitute a bottom for the case as represented in Fig. 6.

When the parts are related so that the device may function as a go-cart, it will be noted that the draft is communicated to the sliding bottom whose forward edge abuts the front wall 19 that is fixedly secured between the sides 10. This assures a proper stop for the bottom so as to obviate any likelihood of the body disengaging therefrom. Other additional locking means to hold the body upon the bottom may be provided, if desired, but are hardly necessary. As shown, the bottom is reversible with respect to the body by being first withdrawn, and then replaced in the proper manner, but the essential feature which is important to this invention resides in the reversibility of its mounting, so that it may, when required, present its under side with wheels thereon toward the seat so as to provide a case entirely smooth on the exterior and containing within its interior all the component parts of the go-cart. The post 32 is provided so that the cart will have proper support when the tongue is lowered the required distance, but otherwise has no special purpose.

The preceding description, as well as the drawings, have been concerned with a preferred embodiment of this invention, which, however, may take other forms without sacrifice of the novel features which are here disclosed for the first time. Accordingly I desire that this patent should include not merely the exact structure herein shown, but such modifications thereof as embody the inventive concept set forth in the claims following.

I claim:

1. A collapsible cart of the kind described comprising a body consisting of a pair of sides, a front, and seat extending rearwardly from the front between the sides, all in rigid relation; a bottom reversibly arranged between the sides below the seat; a pair of wheels swingingly secured in spaced relation to the under side of the bottom, the wheels being adapted to fold inwardly one upon the other; a tongue detachably connected with the bottom; and a foot rest swingingly secured to the forward edge of the bottom and adapted to be supported upon the tongue; the bottom when reversed within the body presenting its forward edge at the opposite end, the folded wheels adjacent the under side of the seat, and the foot rest at the rear end of the body whereby a complete closure in the form of a case is provided, substantially as described.

2. A collapsible cart of the kind described comprising a body consisting of a pair of sides, a front, and a seat extending rearwardly from the front between the sides, all in rigid relation; a seat back hinged at the rear edge of the seat and adapted to fold down thereupon to present its side edges adjacent the upper edges of the body sides; a bottom reversibly arranged between the sides below the seat and in spaced relation thereto; a pair of wheels swingingly secured in spaced relation to the under side of the bottom, the wheels being adapted to fold inwardly one upon the other; and a tongue detachably connected with the bottom and formed of a plurality of disconnectible sections; the bottom when reversed within the body presenting its forward edge at the opposite end and the folded wheels adjacent the under side of the seat, whereby a closure in the form of a case is provided, substantially as described.

3. A collapsible cart of the kind described comprising a body consisting of a pair of sides, a front, and a seat extending rearwardly from the front between the sides, all in rigid relation; a seat back hinged at the rear edge of the seat and adapted to fold down thereupon to present its side edges adjacent the upper edges of the body sides; a bottom reversibly arranged between the sides below the seat and in spaced relation thereto; a pair of wheels swingingly secured in spaced relation to the under side of the bottom, the wheels being adapted to fold inwardly one upon the other; a foot rest swingingly secured to the forward edge of the bottom and having means for maintaining it in position to support the feet of the occupant; the bottom when reversed within the body presenting its forward edge at the opposite end, the folded wheels adjacent the under side of the seat, and the foot rest at the rear end of the body whereby a complete closure in the form of a case is provided, substantially as described.

4. A collapsible cart of the kind described comprising a body in the general form of a box, the upper side whereof is arranged to provide a seat; a bottom below the seat removable from the box and having means for attachment thereto with either of its sides facing the box interior; and a pair of wheels swingingly secured to one side of the bottom, the wheels being adapted to fold one upon the other; the bottom when disposed one way presenting the wheels toward the ground and when disposed the other way presenting the wheels in folded relation within the box, substantially as described.

5. A collapsible cart of the kind described comprising a body in the general form of a box, the upper side whereof is arranged to provide a seat; a bottom below the seat removable from the box and having means for attachment thereto with either of its sides facing the box interior; a pair of wheels swingingly secured to one side of the bottom, the wheels being adapted to fold one upon the other; the bottom when disposed one way presenting the wheels toward the ground and when disposed the other way presenting the wheels in folded relation within the box; and a tongue detachably connected with the box and formed of a plurality of sections no one of which is longer than the box whereby the tongue sections may be packed away interiorly of the box, substantially as described.

6. A collapsible cart of the kind described comprising a body in the general form of a box lacking a rear end; a box top hinged to the body and adapted when upwardly extended to provide a seat back; a seat within the box; a bottom below the seat removable from the box and having means for attachment thereto with either of its sides facing the box interior; a pair of wheels swingingly secured to one side of the bottom, the wheels being adapted to fold one upon the other; and a board swingingly secured to one end of the bottom adapted when disposed adjacent the front end of the box to provide a foot rest and when disposed adjacent the other end of the box to provide a closure for the rear end; the bottom when disposed one way presenting the wheels toward the ground and when disposed the other way presenting the wheels in folded relation within the box, substantially as described.

7. A collapsible cart of the kind described comprising a body in the general form of a box having on its upper side a seat and on its lower side a bottom removably arranged with respect to the box, there being means for holding the bottom stationary upon the box; and a pair of wheels in spaced relation extended downwardly from the box having a mounting thereupon that permits of their folding one upon the other within the box in the space between the seat and bottom, whereby the box may thereupon be used as a case, substantially as described.

GUY R. TREVILLIAN.

Witness:
EPHRAIM BANNING.